United States Patent
Thompson et al.

(10) Patent No.: US 9,865,086 B2
(45) Date of Patent: Jan. 9, 2018

(54) METHODS AND SYSTEMS FOR GENERATING A MULTI-DIMENSIONAL SURFACE MODEL OF A GEOMETRIC STRUCTURE

(71) Applicant: St. Jude Medical, Cardiology Division, Inc., St. Paul, MN (US)

(72) Inventors: Cable Patrick Thompson, St. Paul, MN (US); Daniel Richard Starks, Lake Elmo, MN (US)

(73) Assignee: ST. JUDE MEDICAL, CARDIOLOLGY DIVISION, INC., St. Paul, MN (US)

( * ) Notice: Subject to any disclaimer, the term of this patent is extended or adjusted under 35 U.S.C. 154(b) by 208 days.

(21) Appl. No.: 14/621,965

(22) Filed: Feb. 13, 2015

(65) Prior Publication Data

US 2015/0269775 A1    Sep. 24, 2015

Related U.S. Application Data

(60) Provisional application No. 61/968,554, filed on Mar. 21, 2014.

(51) Int. Cl.
*G06T 17/00*    (2006.01)
*G06T 17/10*    (2006.01)
(Continued)

(52) U.S. Cl.
CPC ............. *G06T 17/10* (2013.01); *G06T 5/30* (2013.01); *G06T 15/08* (2013.01); *G06T 17/00* (2013.01); *G06T 2210/41* (2013.01)

(58) Field of Classification Search
CPC ........... G06T 17/00; G06T 1/30; G06T 15/08; G06T 17/10
See application file for complete search history.

(56) References Cited

U.S. PATENT DOCUMENTS

| | | | |
|---|---|---|---|
| 4,866,785 A * | 9/1989 | Shibano | G06T 5/30 382/257 |
| 5,782,762 A * | 7/1998 | Vining | G06T 7/0012 128/920 |

(Continued)

FOREIGN PATENT DOCUMENTS

| | | |
|---|---|---|
| WO | 2004/032061 A2 | 4/2004 |
| WO | 2004032061 A2 | 4/2004 |

OTHER PUBLICATIONS

ISR/WO for PCT/US2015/015734, dated Jul. 29, 2015.
Bernardini, Fausto: "Sampling and Reconstructing Manifolds Using Alpha-Shapes," 1997, pp. 1-13. (Abstract and Fig. 4).

*Primary Examiner* — Devona E Faulk
*Assistant Examiner* — Charles L Beard
(74) *Attorney, Agent, or Firm* — Armstrong Teasdale LLP

(57) ABSTRACT

The present disclosure provides systems and methods for generating a multi-dimensional surface model of a geometric structure. The system includes a device including at least one sensor configured to collect a set of location data points corresponding to respective locations on or enclosed by a surface of the geometric structure, and a computer-based model construction system coupled to the device. The computer-based model construction system is configured to generate a working volume based on the set of location data points, calculate a dilated field for the working volume, define a dilated surface based on the dilated field, calculate an eroded field for the working volume based on the dilated surface, and define an eroded surface based on the eroded field.

18 Claims, 11 Drawing Sheets

(51) Int. Cl.
   *G06T 5/30*   (2006.01)
   *G06T 15/08*  (2011.01)

(56) References Cited

U.S. PATENT DOCUMENTS

| | | | |
|---|---|---|---|
| 5,891,030 A * | 4/1999 | Johnson | A61B 6/032 128/920 |
| 6,058,218 A * | 5/2000 | Cline | A61B 6/481 382/128 |
| 6,083,162 A * | 7/2000 | Vining | G06T 7/0012 128/920 |
| 6,277,107 B1 * | 8/2001 | Lurie | A61M 25/0041 604/523 |
| 6,493,460 B1 * | 12/2002 | MacAulay | G01N 15/1475 382/128 |
| 6,591,004 B1 * | 7/2003 | VanEssen | G06T 17/00 128/922 |
| 6,694,163 B1 * | 2/2004 | Vining | G06T 17/00 128/920 |
| 6,975,755 B1 * | 12/2005 | Baumberg | G06K 9/4642 345/419 |
| 7,040,896 B2 | 5/2006 | Pavlovskaia | A61C 5/00 433/215 |
| 7,123,766 B2 * | 10/2006 | Mao | G06K 9/3233 345/419 |
| 7,134,874 B2 * | 11/2006 | Chishti | A61C 7/00 433/24 |
| 7,154,500 B2 * | 12/2006 | Heng | G06T 15/04 345/424 |
| 7,167,180 B1 * | 1/2007 | Shibolet | G06T 7/155 345/418 |
| 7,263,397 B2 * | 8/2007 | Hauck | A61B 5/0422 600/374 |
| 7,365,745 B2 * | 4/2008 | Olson | G06T 17/10 345/419 |
| 7,379,572 B2 * | 5/2008 | Yoshida | G06T 7/0012 382/128 |
| 7,760,941 B2 * | 7/2010 | Bornemann | G06K 9/00 382/132 |
| 7,853,310 B2 * | 12/2010 | Vining | A61B 5/1076 382/128 |
| 7,889,905 B2 * | 2/2011 | Higgins | A61B 1/00147 382/130 |
| 7,905,725 B2 * | 3/2011 | Chishti | A61C 7/00 433/24 |
| 7,936,922 B2 * | 5/2011 | Berger | G06K 9/342 358/538 |
| 7,945,105 B1 * | 5/2011 | Jaenisch | G01V 5/0008 382/128 |
| 7,988,639 B2 * | 8/2011 | Starks | A61B 5/0402 600/424 |
| 8,000,941 B2 * | 8/2011 | Olson | G06T 17/00 703/1 |
| 8,064,668 B2 * | 11/2011 | Dutta | G06K 9/03 382/128 |
| 8,369,614 B2 * | 2/2013 | Lin | G06T 5/30 382/162 |
| 8,494,245 B2 * | 7/2013 | Liao | A61B 6/4441 345/419 |
| 8,496,474 B2 * | 7/2013 | Chishti | A61C 7/00 433/24 |
| 8,787,669 B2 * | 7/2014 | Litvin | G06T 7/155 381/170 |
| 8,909,502 B2 * | 12/2014 | Voth | G06T 19/00 703/1 |
| 9,020,217 B2 * | 4/2015 | Amyot | G06T 19/00 382/128 |
| 9,119,713 B2 * | 9/2015 | Board | A61F 2/2403 |
| 9,159,162 B2 * | 10/2015 | Carbonera | G06T 17/00 |
| 9,196,080 B2 * | 11/2015 | Neuman | G06T 15/08 |
| 9,245,323 B2 * | 1/2016 | Bai | G06T 5/002 |
| 9,265,434 B2 * | 2/2016 | Merschon | A61B 5/04017 |
| 9,280,825 B2 * | 3/2016 | Huang | G06F 19/3406 |
| 9,282,915 B2 * | 3/2016 | Carbonera | A61B 5/1076 |
| 9,569,855 B2 * | 2/2017 | Kim | G06T 7/194 |
| 2003/0052875 A1 * | 3/2003 | Salomie | G06T 17/20 345/419 |
| 2003/0223627 A1 * | 12/2003 | Yoshida | G06T 7/0012 382/128 |
| 2004/0252870 A1 * | 12/2004 | Reeves | G06T 7/0012 382/128 |
| 2005/0163358 A1 * | 7/2005 | Moeller | G06K 9/342 382/128 |
| 2006/0285737 A1 * | 12/2006 | Hamill | G06T 11/008 382/131 |
| 2006/0290695 A1 * | 12/2006 | Salomie | G06T 17/20 345/420 |
| 2007/0053490 A1 * | 3/2007 | Wang | A61N 5/1031 378/65 |
| 2007/0057945 A1 * | 3/2007 | Olson | G06T 17/10 345/424 |
| 2007/0217668 A1 * | 9/2007 | Bornemann | G06K 9/00 382/132 |
| 2007/0244850 A1 * | 10/2007 | Hoppe | G06F 17/30262 |
| 2007/0276228 A1 * | 11/2007 | Vining | A61B 5/1076 600/425 |
| 2008/0118135 A1 * | 5/2008 | Averbuch | G06T 7/0012 382/131 |
| 2008/0183073 A1 * | 7/2008 | Higgins | G06T 19/003 600/425 |
| 2008/0205717 A1 * | 8/2008 | Reeves | G06T 7/0012 382/128 |
| 2009/0171627 A1 * | 7/2009 | Olson | G06T 17/00 703/1 |
| 2009/0306507 A1 * | 12/2009 | Hyun | A61B 8/08 600/443 |
| 2010/0040200 A1 * | 2/2010 | Ema | A61B 6/503 378/98.12 |
| 2010/0149917 A1 * | 6/2010 | Imhof | G01V 1/32 367/53 |
| 2010/0249579 A1 * | 9/2010 | Starks | A61B 5/042 600/424 |
| 2010/0309198 A1 * | 12/2010 | Kauffmann | A61B 6/504 345/419 |
| 2011/0115787 A1 * | 5/2011 | Kadlec | G01V 1/345 345/419 |
| 2013/0138404 A1 | 5/2013 | Carbonera | |
| 2013/0151161 A1 * | 6/2013 | Imhof | G01V 1/003 702/14 |
| 2013/0169638 A1 * | 7/2013 | Carbonera | G06T 17/00 345/424 |
| 2013/0173230 A1 * | 7/2013 | Carbonera | G06T 17/00 703/2 |
| 2013/0335417 A1 * | 12/2013 | McQueston | A61B 6/145 345/424 |
| 2014/0225887 A1 * | 8/2014 | Aguirre-Valencia | H04N 13/0022 345/419 |
| 2014/0267266 A1 * | 9/2014 | Crassin | G06T 15/08 345/424 |
| 2014/0343900 A1 * | 11/2014 | Goldstein | A61B 6/032 703/1 |
| 2015/0078641 A1 * | 3/2015 | Tan | G06T 7/136 382/131 |
| 2015/0178978 A1 * | 6/2015 | Durand | G06T 5/50 382/128 |
| 2016/0104290 A1 * | 4/2016 | Patnaik | G06T 7/73 382/173 |
| 2016/0163048 A1 * | 6/2016 | Yee | G06F 3/016 382/131 |
| 2016/0300343 A1 * | 10/2016 | Gazit | G06T 7/11 |
| 2017/0249529 A1 * | 8/2017 | Young | G06K 9/46 |

* cited by examiner

METHODS AND SYSTEMS FOR GENERATING A MULTI-DIMENSIONAL SURFACE MODEL OF A GEOMETRIC STRUCTURE

CROSS-REFERENCE TO RELATED APPLICATIONS

This application claims the benefit of U.S. Provisional Patent Application No. 61/968,554, filed Mar. 21, 2014, the entire specification of which is incorporated herein.

FIELD OF THE DISCLOSURE

This disclosure relates to systems and methods for generating a multi-dimensional model of a geometric structure. More particularly, this disclosure relates to computer-implemented systems and methods for generating a multi-dimensional model of a geometric structure, such as, for example, an intra-cardiac structure.

BACKGROUND ART

It is known that various computer-based systems and computer-implemented methodologies can be used to generate multi-dimensional surface models of geometric structures, such as, for example, anatomic structures. More specifically, a variety of systems and methods have been used to generate multi-dimensional surface models of the heart and/or particular portions thereof.

One conventional methodology or technique involves the generation of a plurality of individual surface models corresponding to different regions of interest of a particular structure, and then joining the individual surface models together to form a single composite multi-dimensional surface model. It is known to generate the individual surface models by collecting location data points from the surfaces and volumes enclosed by the surfaces of the respective regions of interest and then using those location data points to generate an individual surface model for each region of interest.

Any number of techniques can be used to generate the individual surface models from the respective location data points, including, for example, convex hull, star-shaped domain approximation, and alpha-shape techniques. Conventional techniques for generating composite surface models are not without their drawbacks, however. For example, individual surface models may not reflect the corresponding region of interest with a desired degree detail or accuracy, or the surface models may be less than ideal for multi-dimensional Boolean operations. Either one of these drawbacks may result in a composite surface model that does not reflect the structure of interest with the desired degree of accuracy. Moreover, at least some conventional techniques are computationally intensive, and may take a relatively long time and/or require relatively large processing resources.

Thus, using at least some known techniques, surface models that are formed using collections of location data points may not provide the desired degree of accuracy and/or may require an undesirable amount of additional processing that increases the complexity of, and the length of time required to perform, the surface model generation process.

BRIEF SUMMARY OF THE DISCLOSURE

In one embodiment, the present disclosure is directed to a system for generating a multi-dimensional surface model of a geometric structure. The system includes a device including at least one sensor configured to collect a set of location data points corresponding to respective locations on or enclosed by a surface of the geometric structure, and a computer-based model construction system coupled to the device. The computer-based model construction system is configured to generate a working volume based on the set of location data points, calculate a dilated field for the working volume, define a dilated surface based on the dilated field, calculate an eroded field for the working volume based on the dilated surface, and define an eroded surface based on the eroded field.

In another embodiment, the present disclosure is directed to a computer-implemented method of generating a multi-dimensional surface model of a geometric structure. The method includes acquiring a set of location data points corresponding to respective locations on or enclosed by a surface of the geometric structure, generating a working volume based on the set of location data points, calculating a dilated field for the working volume, defining a dilated surface based on the dilated field, calculating an eroded field for the working volume based on the dilated surface, and defining an eroded surface based on the eroded field.

In another embodiment, the present disclosure is directed to a processing apparatus for generating a multi-dimensional surface model of a geometric structure. The processing apparatus is configured to acquire a set of location data points corresponding to respective locations on or enclosed by a surface of the geometric structure, generate a working volume based on the set of location data points, calculate a dilated field for the working volume, define a dilated surface based on the dilated field, calculate an eroded field for the working volume based on the dilated surface, and define an eroded surface based on the eroded field.

The foregoing and other aspects, features, details, utilities and advantages of the present disclosure will be apparent from reading the following description and claims, and from reviewing the accompanying drawings.

BRIEF DESCRIPTION OF THE DRAWINGS

Corresponding reference characters indicate corresponding parts throughout the several views of the drawings.

DETAILED DESCRIPTION OF THE DISCLOSURE

The disclosure provides systems and methods for generating a surface model (e.g., an interior surface of the heart).

The techniques described herein generate a closed, manifold surface, with a controllable amount of fine detail determined by changing values of a first predetermined value, a, and a second predetermined value, k, as described herein.

Figure 1:
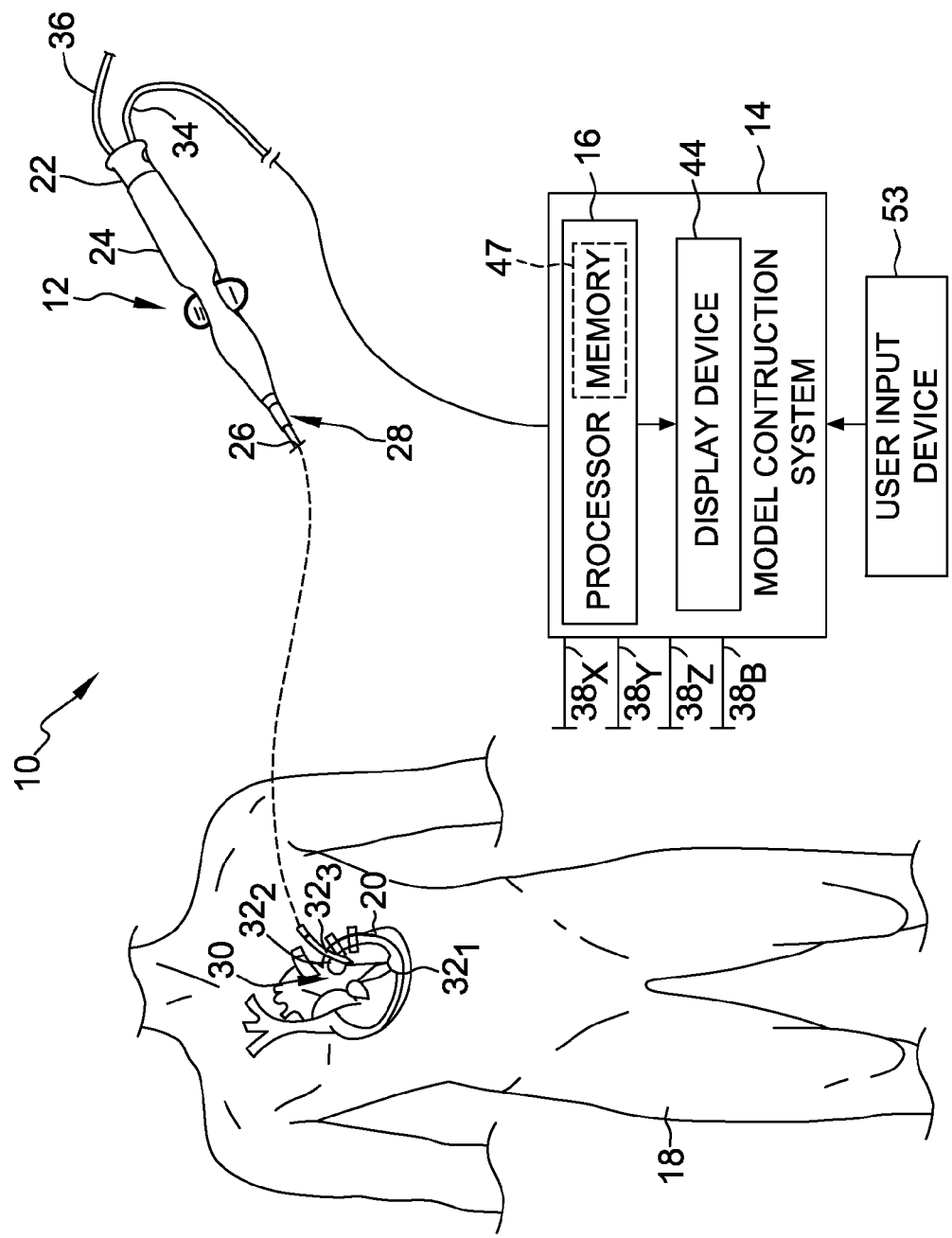
FIG. 1 is a diagrammatic view of a system for generating a multi-dimensional surface model of a geometric structure according to one embodiment.

Referring now to the drawings wherein like reference numerals are used to identify identical components in the various views, FIG. 1 illustrates one exemplary embodiment of a system 10 for generating a multi-dimensional surface model of one or more geometric structures. As will be described below, in this embodiment, the model generated by system 10 is a three-dimensional model. It will be appreciated, however, that while the generation of a three-dimensional model is described below, the present disclosure is not meant to be so limited. Rather, in other embodiments, system 10 may be configured to generate multi-dimensional models other than in three-dimensions, and such embodiments remain within the spirit and scope of the present disclosure.

It should be further noted that while the following description focuses primarily on the use of system 10 in the generation of models of anatomic structures, and cardiac structures in particular, the present disclosure is not meant to be so limited. Rather, system 10, and the methods and techniques used thereby, may be applied to the generation of three-dimensional models of any number of geometric structures, including anatomic structures other than cardiac structures. However, for purposes of illustration and ease of description, the description below will be limited to the use of system 10 in the generation of three-dimensional models of cardiac structures.

With continued reference to FIG. 1, in this embodiment, the system 10 includes, among other components, a medical device and a model construction system 14. In this embodiment, medical device is a catheter 12, and model construction system 14 includes, in part, a processing apparatus 16. Processing apparatus 16 may take the form of an electronic control unit, for example, that is configured to construct a three-dimensional model of structures within the heart using data collected by catheter 12

As illustrated in FIG. 1, catheter 12 is configured to be inserted into a patient's body 18, and more particularly, into the patient's heart 20. Catheter 12 may include a cable connector or interface 22, a handle 24, a shaft 26 having a proximal end 28 and a distal end 30 (as used herein, "proximal" refers to a direction toward the portion of the catheter 12 near the clinician, and "distal" refers to a direction away from the clinician and (generally) inside the body of a patient), and one or more sensors 32 (e.g., $32_1$, $32_2$, $32_3$) mounted in or on shaft 26 of catheter 12. In this embodiment, sensors 32 are disposed at or near distal end 30 of shaft 26. Catheter 12 may further include other conventional components such as, for example and without limitation, a temperature sensor, additional sensors or electrodes, ablation elements (e.g., ablation tip electrodes for delivering RF ablative energy, high intensity focused ultrasound ablation elements, etc.), and corresponding conductors or leads.

Connector 22 provides mechanical, fluid, and electrical connection(s) for cables, such as, for example, cables 34, 36 extending to model construction system 14 and/or other components of system 10 (e.g., a visualization, navigation, and/or mapping system (if separate and distinct from model construction system 14), an ablation generator, irrigation source, etc.). Connector 22 is conventional in the art and is disposed at proximal end 28 of catheter 12, and handle 24 thereof, in particular.

Handle 24, which is disposed at proximal end 28 of shaft 26, provides a location for the clinician to hold catheter 12 and may further provide means for steering or guiding shaft 26 within body 18 of the patient. For example, handle 24 may include means to change the length of a steering wire extending through catheter 12 to distal end 30 of shaft 26 to steer shaft 26. Handle 24 is also conventional in the art and it will be understood that the construction of handle 24 may vary. In other embodiments, catheter 12 may be robotically driven or controlled. Accordingly, rather than a clinician manipulating a handle to steer or guide catheter 12 and shaft 26 thereof, in such an embodiments, a robot is used to manipulate catheter 12.

Shaft 26 is an elongate, tubular, flexible member configured for movement within body 18. Shaft 26 supports, for example and without limitation, sensors and/or electrodes mounted thereon, such as, for example, sensors 32, associated conductors, and possibly additional electronics used for signal processing and conditioning. Shaft 26 may also permit transport, delivery, and/or removal of fluids (including irrigation fluids, cryogenic ablation fluids, and bodily fluids), medicines, and/or surgical tools or instruments. Shaft 26 may be made from conventional materials such as polyurethane, and defines one or more lumens configured to house and/or transport electrical conductors, fluids, or surgical tools. Shaft 26 may be introduced into a blood vessel or other structure within the body 18 through a conventional introducer. Shaft 26 may then be steered or guided through body 18 to a desired location, such as heart 20, using means well known in the art.

Sensors 32 mounted in or on shaft 26 of catheter 12 may be provided for a variety of diagnostic and therapeutic purposes including, for example and without limitation, electrophysiological studies, pacing, cardiac mapping, and ablation. In this embodiment, one or more of sensors 32 are provided to perform a location or position sensing function. More particularly, and as will be described in greater detail below, one or more of sensors 32 are configured to be a positioning sensor(s) that provides information relating to the location (position and orientation) of catheter 12, and distal end 30 of shaft 26 thereof, in particular, at certain points in time. Accordingly, as catheter 12 is moved along a surface of a structure of interest of heart 20 and/or about the interior of the structure, sensor(s) 32 can be used to collect location data points that correspond to the surface of, and/or other locations within, the structure of interest. These location data points can then be used by, for example, model construction system 14, in the construction of a three-dimensional model of the structure of interest, which will be described in greater detail below. For purposes of clarity and illustration, the description below will discuss an embodiment wherein multiple sensors 32 of catheter 12 comprise positioning sensors. It will be appreciated, however, that in other embodiments, which remain within the spirit and scope of the present disclosure, catheter 12 may comprise both one or more positioning sensors as well as other sensors configured to perform other diagnostic and/or therapeutic functions.

As briefly described above, and as will be described in greater detail below, model construction system 14 is configured to construct a three-dimensional model of structures within the heart using, in part, location data collected by catheter 12. More particularly, processing apparatus 16 of model construction system 14 is configured to acquire location data points collected by sensor(s) 32 and to then use those location data points in the construction or generation of a model of the structure(s) to which the location data points correspond. In this embodiment, model construction system 14 acquires the location data points by functioning with sensors 32 to collect location data points. In other embodiments, however, model construction system 14 may simply acquire the location data points from sensors 32 or another component in system 10, such as, for example, a memory or other storage device that is part of model construction system 14 or accessible thereby, without affirmatively taking part in the collection of the location data points. Model construction system 14 is configured to construct a three-dimensional model based on some or all of the collected location data points. For purposes of illustration and clarity, the description below will be limited to an embodiment wherein model construction system 14 is configured to both construct the model and also acquire location data points by functioning with sensor(s) 32 in the collection of the location data points. It will be appreciated, however, that other embodiments wherein model construction system 14 only acquires location data points from sensor(s) 32 or another component of system 10 and then constructs a three-dimensional model based thereon remain within the spirit and scope of the present disclosure.

Accordingly, in this embodiment, in addition to constructing a model of a structure, model construction system 14 is configured to function with sensor(s) 32 to collect location data points that are used in the construction of a three-dimensional model. Model construction system 14 may comprise an electric field-based system, such as, for example, the EnSite™ NavX™ system commercially available from St. Jude Medical, Inc., and generally shown with reference to U.S. Pat. No. 7,263,397 entitled "Method and Apparatus for Catheter Navigation and Location and Mapping in the Heart", the entire disclosure of which is incorporated herein by reference. In other embodiments, however, model construction system 14 may comprise other types of systems, such as, for example and without limitation: a magnetic-field based system such as the Carto™ System available from Biosense Webster, and as generally shown with reference to one or more of U.S. Pat. No. 6,498,944 entitled "Intrabody Measurement," U.S. Pat. No. 6,788,967 entitled "Medical Diagnosis, Treatment and Imaging Systems," and U.S. Pat. No. 6,690,963 entitled "System and Method for Determining the Location and Orientation of an Invasive Medical Instrument," the entire disclosures of which are incorporated herein by reference, or the gMPS system from MediGuide Ltd., and as generally shown with reference to one or more of U.S. Pat. No. 6,233,476 entitled "Medical Positioning System," U.S. Pat. No. 7,197,354 entitled "System for Determining the Position and Orientation of a Catheter," and U.S. Pat. No. 7,386,339 entitled "Medical Imaging and Navigation System," the entire disclosures of which are incorporated herein by reference; a combination electric field-based and magnetic field-based system such as the Carto 3™ System also available from Biosense Webster; as well as other impedance-based localization systems, acoustic or ultrasound-based systems, and commonly available fluoroscopic, computed tomography (CT), and magnetic resonance imaging (MRI)-based systems.

As briefly described above, sensor(s) 32 of catheter 12 include positioning sensors. Sensor(s) 32 produce signals indicative of catheter location (position and/or orientation) information. In this embodiment, wherein model construction system 14 is an electric field-based system, sensor(s) 32 may comprise one or more electrodes. Alternatively, in an embodiment wherein model construction system 14 is a magnetic field-based system, sensor(s) 32 may include one or more magnetic sensors configured to detect one or more characteristics of a low-strength magnetic field. For instance, in one exemplary embodiment, sensor(s) 32 may include magnetic coils disposed on or in shaft 26 of catheter 12.

For purposes of clarity and illustration, model construction system 14 will hereinafter be described as including an electric field-based system, such as, for example, the EnSite™ NavX™ system identified above. It will be appreciated that while the description below is primarily limited to an embodiment wherein sensor(s) 32 include one or more electrodes, in other embodiments, sensor(s) 32 may include one or more magnetic field sensors (e.g., coils). Accordingly, model construction systems that include positioning sensor(s) other than the sensors or electrodes described below remain within the spirit and scope of the present disclosure.

Figure 2:
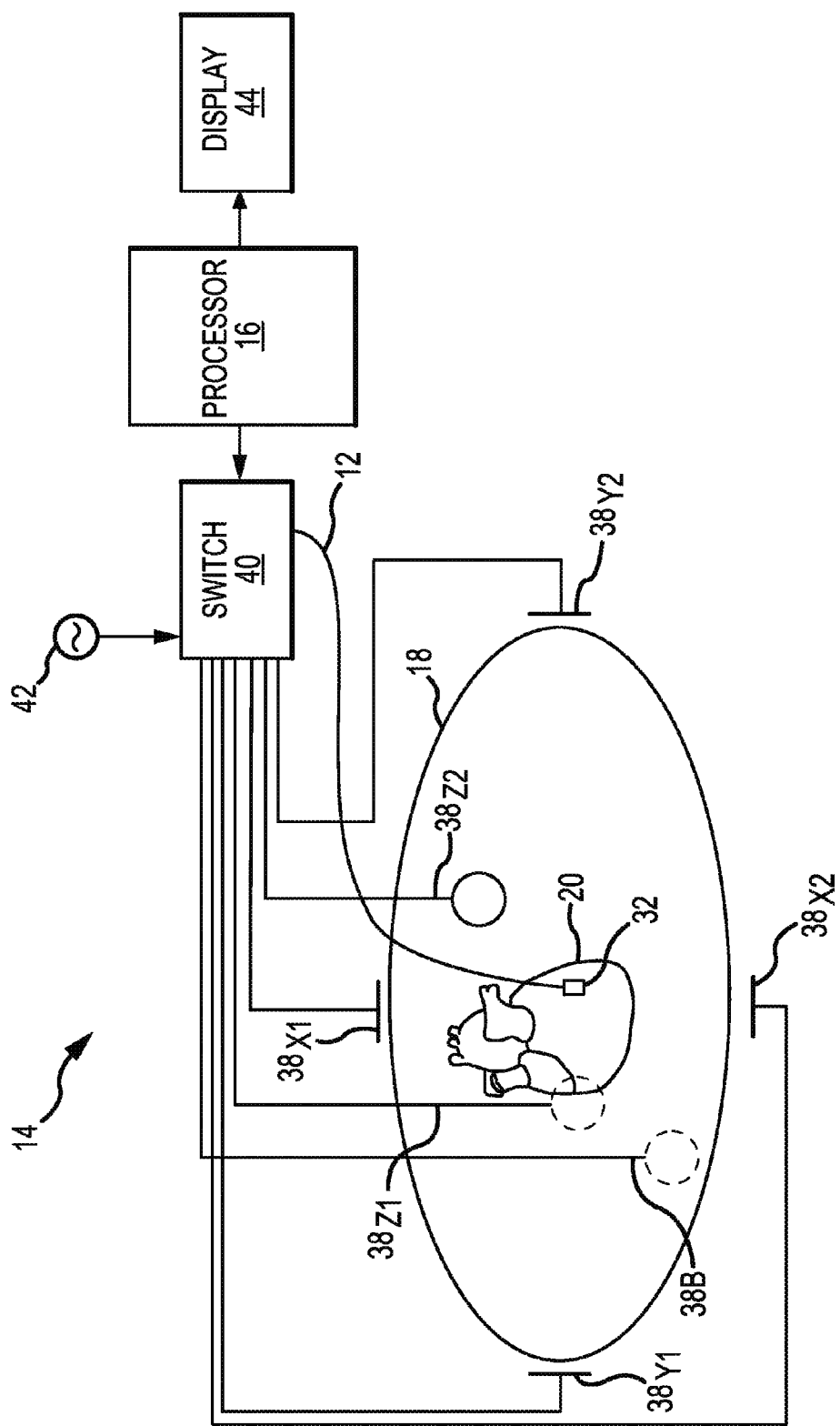
FIG. 2 is a diagrammatic and schematic view of a model construction system of the system illustrated in FIG. 1.

With reference to FIG. 2, in addition to the processing apparatus 16, model construction system 14 may include, among other possible components, a plurality of patch electrodes 38, a multiplex switch 40, a signal generator 42, and a display device 44. In other embodiments, some or all of these components are separate and distinct from model construction system 14 but are electrically connected to, and configured for communication with, model construction system 14.

Processing apparatus 16 may include a programmable microprocessor or microcontroller, or may include an application specific integrated circuit (ASIC). Processing apparatus 16 may include a central processing unit (CPU) and an input/output (I/O) interface through which the processing apparatus 16 may receive a plurality of input signals including, for example, signals generated by patch electrodes 38 and sensor(s) 32, and generate a plurality of output signals including, for example, those used to control and/or provide data to, for example, display device 44 and switch 40. Processing apparatus 16 may be configured to perform various functions, such as those described in greater detail above and below, with appropriate programming instructions or code (i.e., software). Accordingly, processing apparatus 16 is programmed with one or more computer programs encoded on a computer storage medium for performing the functionality described herein.

With the possible exception of patch electrode $38_B$ called a "belly patch," patch electrodes 38 are provided to generate electrical signals used, for example, in determining the position and orientation of catheter 12. In one embodiment, patch electrodes 38 are placed orthogonally on the surface of body 18 and are used to create axes-specific electric fields within body 18. For instance, in one embodiment, patch electrodes $38_{X1}$, $38_{X2}$ may be placed along a first (x) axis. Patch electrodes $38_{Y1}$, $38_{Y2}$ may be placed along a second (y) axis, and patch electrodes $38_{Z1}$, $38_{Z2}$ may be placed along a third (z) axis. Each of patch electrodes 38 may be coupled to multiplex switch 40. In this embodiment, processing apparatus 16 is configured, through appropriate software, to provide control signals to switch 40 to thereby sequentially couple pairs of electrodes 38 to signal generator 42. Excitation of each pair of electrodes 38 generates an electric field within body 18 and within an area of interest such as heart 20. Voltage levels at non-excited electrodes 38, which are referenced to belly patch $38_B$, are filtered and converted and provided to processing apparatus 16 for use as reference values.

In this embodiment, sensor(s) 32 of catheter 12 are electrically coupled to processing apparatus 16 and are configured to serve a position sensing function. More particularly, sensor(s) 32 are placed within electric fields created in body 18 (e.g., within the heart) by exciting patch electrodes 38. For purposes of clarity and illustration only, the description below will be limited to an embodiment wherein a single sensor 32 is placed within electric fields. It will be appreciated, however, that in other embodiments that remain within the spirit and scope of the present disclosure, a plurality of sensors 32 can be placed within the electric fields and then positions and orientations of each sensor can be determined using the techniques described below.

When disposed within the electric fields, sensor 32 experiences voltages that are dependent on the location between patch electrodes 38 and the position of sensor 32 relative to tissue. Voltage measurement comparisons made between sensor 32 and patch electrodes 38 can be used to determine the location of sensor 32 relative to the tissue. Accordingly, as catheter 12 is swept about or along a particular area or surface of interest, processing apparatus 16 receives signals (location information) from sensor 32 reflecting changes in voltage levels on sensor 32 and from the non-energized patch electrodes 38. Using various known algorithms, the processing apparatus 16 may then determine the location (position and orientation) of sensor 32 and record it as a location data point 46 (also referred to herein as "data point 46" and illustrated in FIG. 3) corresponding to a location of sensor 32, and therefore, a point on the surface or in the interior of the structure of interest being modeled, in a memory or storage device, such as memory 47, associated with or accessible by processing apparatus 16. In some embodiments, prior to recording the location as a location data point, the raw location data represented by the signals received by processing apparatus 16 may be corrected by processing apparatus 16 to account for respiration, cardiac activity, and other artifacts using known or hereafter developed techniques. Further, locations of other portions of catheter 12 may be interred from measurements at sensors 32, such as by interpolation or extrapolation, to generate further location data points 46. In any event, the collection of location data points 46 ($46_1$, $46_2$, . . . , $46_n$) taken over time results in the formation of a point cloud 48 (best shown in FIG. 3) stored in the memory or storage device.

While the description above has thus far been generally with respect to an orthogonal arrangement of patch electrodes 38, the present disclosure is not meant to be so limited. Rather, in other embodiments, non-orthogonal arrangements may be used to determine the location coordinates of sensor 32. For example, and in general terms, FIGS. 4A-4D depict a plurality of exemplary non-orthogonal dipoles $D_0$, $D_1$, $D_2$, and $D_3$, set in a coordinate system 50. In FIGS. 4A-4D, the X-axis patch electrodes are designated $X_A$ and $X_B$, the Y-axis patch electrodes are designated $Y_A$ and $Y_B$, and the Z-axis patch electrodes are designated $Z_A$ and $Z_B$. For any desired axis, the potentials measured across an intra-cardiac sensor, such as sensor 32, resulting from a predetermined set of drive (source sink) configurations may be combined algebraically to yield the same effective potential as would be obtained simply by driving a uniform current along the orthogonal axes. Any two of the patch electrodes $38_{X1}$, $38_{X2}$, $38_{Y1}$, $38_{Y2}$, $38_{Z1}$, and $38_{Z2}$ (See FIG. 2) may be selected as a dipole source and drain with respect to a ground reference, e.g., belly patch $38_B$, while the unexcited patch electrodes measure voltage with respect to the ground reference. Sensor 32 placed in heart 20 is also exposed to the field for a current pulse and is measured with respect to ground (e.g., belly patch $38_B$).

In another exemplary embodiment, multiple patch electrodes 38 may be arranged linearly along a common axis. In such an embodiment, excitation of an electrode pair comprising one of patch electrodes 38 and an electrode mounted on catheter 12 generates an electric field. The non-excited patch electrodes 38 may then measure potentials that can be used to determine the position of sensor 32. Accordingly, in such an embodiment, the excitation of multiple electrode pairs comprising different patch electrodes 38 and the catheter-mounted electrode may be used to determine the position of sensor 32.

Data sets from each of patch electrodes 38 and the sensor 32 are all used to determine the location of sensor 32 within heart 20. After the voltage measurements are made, a different pair of patch electrodes 38 is excited by the current source and the voltage measurement process of the remaining patch electrodes 38 and sensor 32 takes place. Once the location of sensor 32 is determined, and as was described above, the location may be recorded as a data point 46 in the same manner described above. In some embodiments, prior to recording the location as a location data point, the raw location data represented by the signals received by processing apparatus 16 may be corrected by processing apparatus 16 to account for respiration, cardiac activity, and other artifacts using known or hereafter developed techniques. Accordingly, it will be appreciated that any number of techniques may be used to determine locations of sensor 32 and to, therefore, collect data points corresponding thereto, each of which remains within the spirit and scope of the present disclosure.

Figure 3:
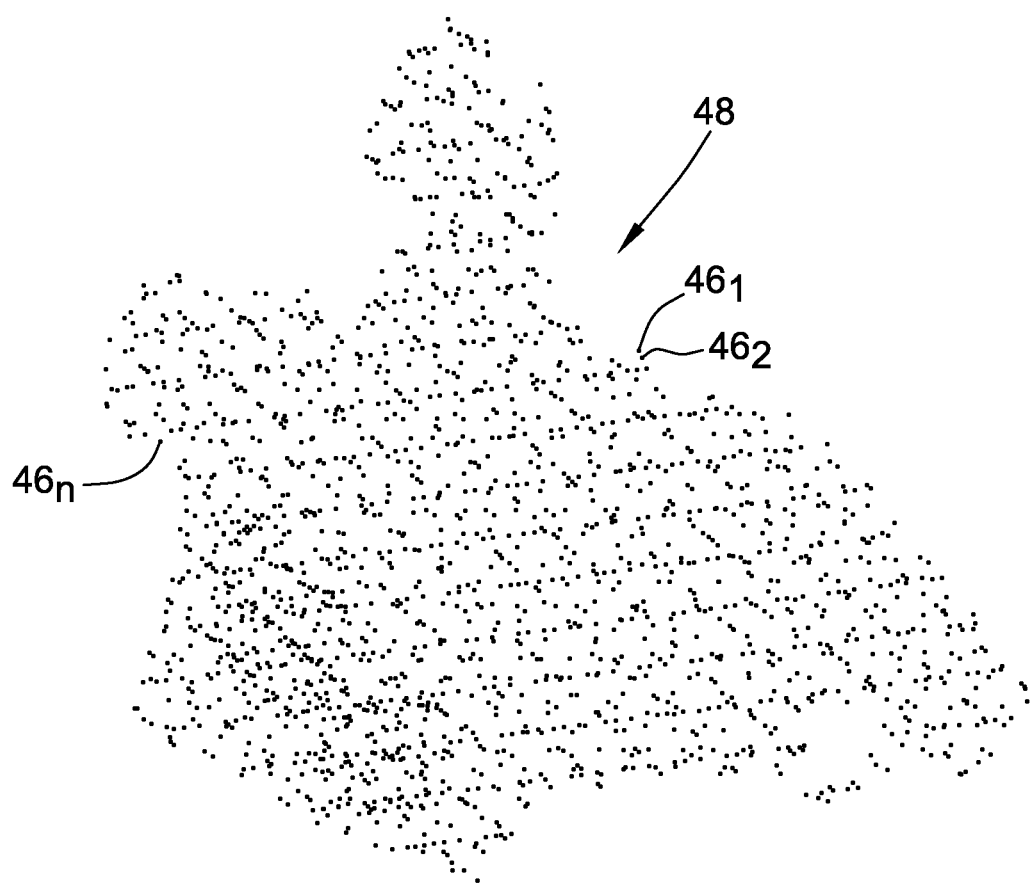
FIG. 3 is a schematic view of a point cloud containing a collection of location data points.
Figure 4A:
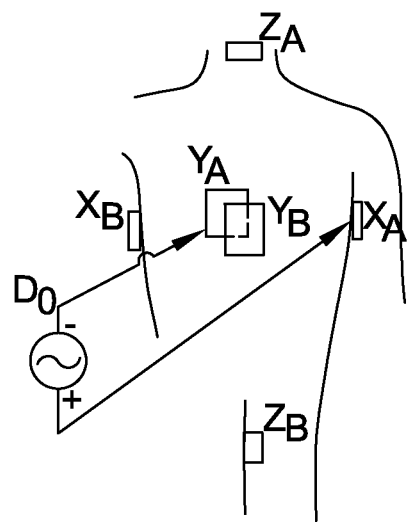
FIGS. 4A-4D are schematic diagrams of exemplary dipole pairs of driven patch electrodes suitable for use in the model construction system illustrated in FIG. 2.
Figure 4B:
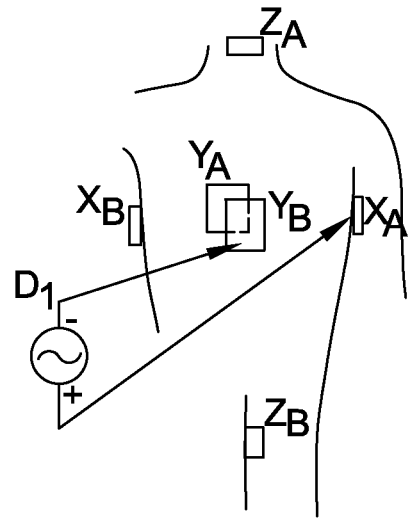
Figure 4C:
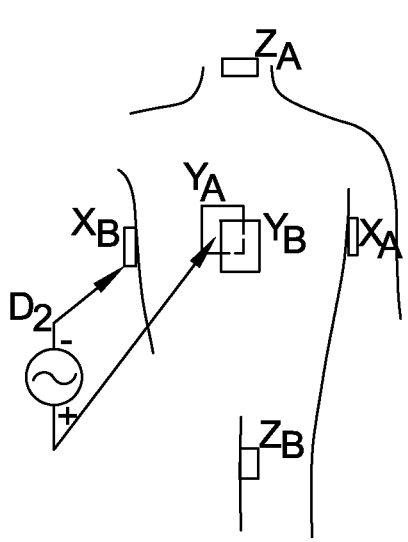
Figure 4D:
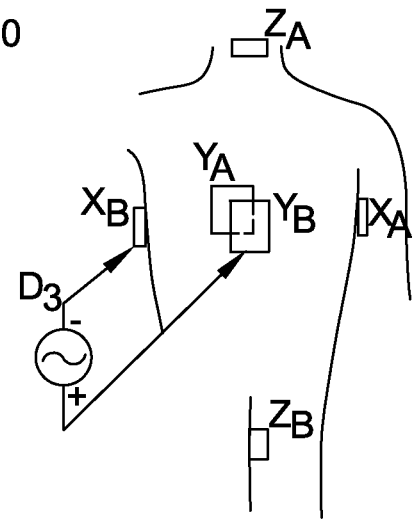

FIG. 3 is illustrative of the point cloud 48 including location data points $46_1$, $46_2$, . . . $46_n$ corresponding to a particular structure of interest being modeled. It will be appreciated that in practice, the point cloud 48 would generally include hundreds to hundreds of thousands of data points 46. For purposes of illustration and ease of description, however, the description below will be limited to a point cloud having a limited number of location data points, such as, for example, point cloud 48 including location data points 46. It will be further appreciated that location data points 46 corresponding to different regions of the structure of interest may be collected. In such an embodiment, processing apparatus 16 may be configured to group data points 46 corresponding to the region of the structure of interest from which they were collected. As such, if there are two regions of the structure of interest, all of the location data points corresponding to a first region will be grouped together and form a first point cloud, while all of the data points corresponding to a second region will be likewise grouped together and form a second point cloud.

Figure 5:
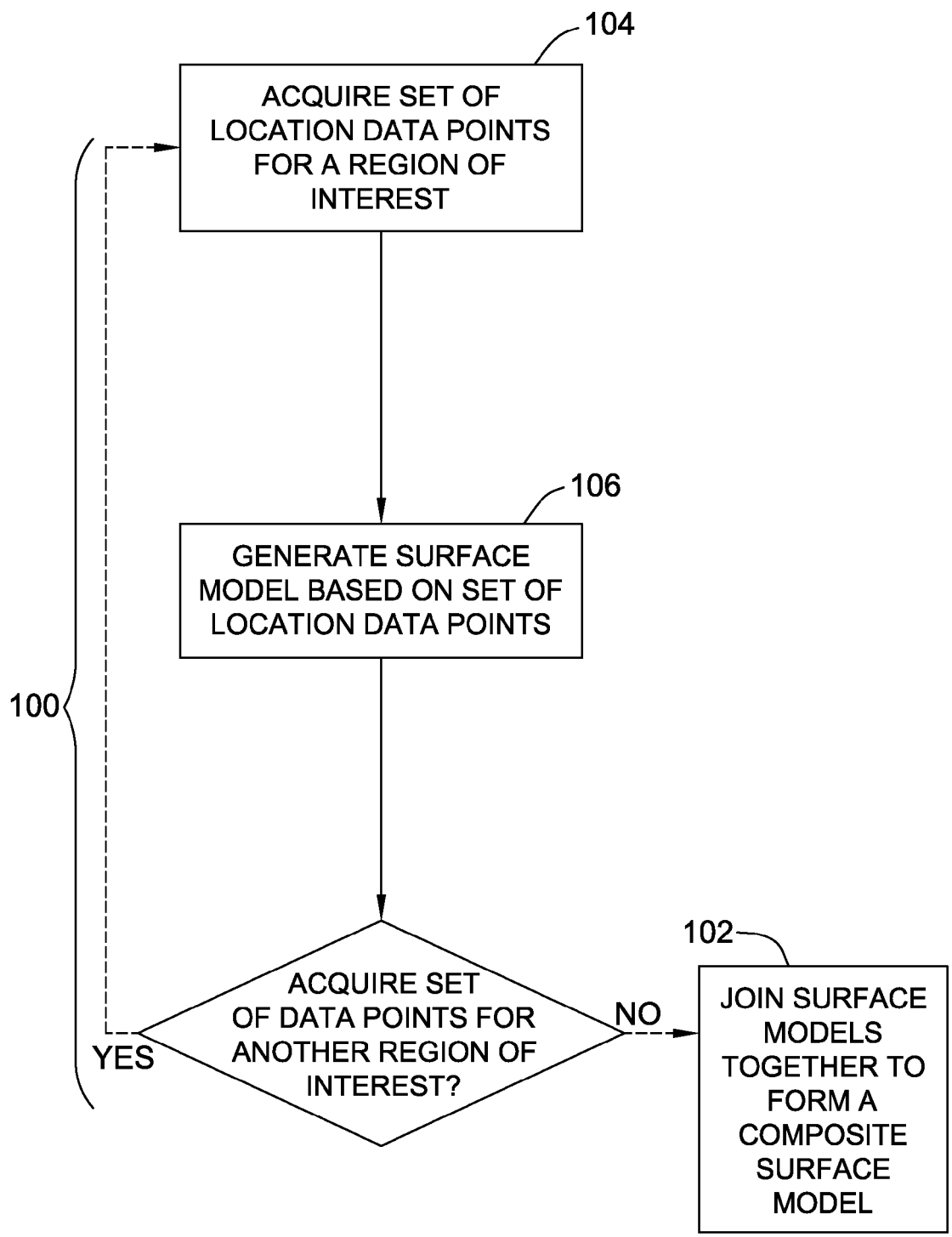
FIG. 5 is a flow diagram illustrating a method of generating a multi-dimensional surface model according to one embodiment.

In one exemplary embodiment, and with reference to FIG. 5, processing apparatus 16 is configured, in general terms, to first generate 100 one or more surface models of one or more individual regions of an anatomic structure of interest. In embodiments where two or more surface models of two more individual regions of interest are generated, processing apparatus 16 may be further configured to join 102 the plurality of individual surface models together to form a composite surface model of the structure of interest.

A surface model (or each surface model used to generate a composite surface model) may be generated in a number of ways. In this embodiment, such as that illustrated in FIG. 5, and in general terms, processing apparatus 16 is configured to initially acquire a first set of location data points 46 corresponding to a first region of interest. Processing apparatus 16 may also gather a second set of location data points 46 corresponding to a second region of interest. As was described above, each location data point 46 in the first set of location data points corresponds to a respective location on or within a volume enclosed by the surface of the first region of the anatomic structure of interest, while each data point 46 in the second set of location data points corresponds to a respective location on or within a volume enclosed by the surface of the second region of the anatomic structure of interest.

As described elsewhere herein, processing apparatus 16 is configured to acquire 104 the location data points in a number of ways. In this embodiment, processing apparatus 16 acquires the location data points from sensor 32, which collects the location data points from the surface of the structure. In other embodiments, processing apparatus 16 acquires the sets of location data points by obtaining them from a memory or storage device that is part of or electrically connected to, and configured for communication with, processing apparatus 16. Accordingly, processing apparatus 16 may acquire the sets of location data points (and the location data points thereof) from one of any number of sources, each of which remain within the spirit and scope of the present disclosure. Using the respective sets of location data points 46, processing apparatus 16 is configured to generate surface models of each region of interest, as described herein.

Once one or more sets of location data points 46 are acquired, processing apparatus 16 is configured to generate 106 one or more individual surface models of each region of interest based on the location data points 46 in the respective sets of location data points 46. To do so, and in general terms, processing apparatus 16 then uses the acquired one or more sets of location data points 46 to generate 106 the surface models using a surface reconstruction technique, such as the alpha-hull technique described in detail herein.

While the description of the generation of individual surface models has thus far been in general terms, an exemplary embodiment of a process for generating the individual surface models will now be described in greater detail. In this embodiment, the individual surface models are generated using the particular alpha-hull technique or algorithm that is described herein below. It will be appreciated, however, that in other embodiments, different techniques, or a combination of techniques may be used to generate voxel-based surface models. One such exemplary technique is the Marching Cubes technique or algorithm. Another such exemplary technique is that described in U.S. Pat. No. 8,000,941 issued on Aug. 16, 2011 and entitled "System and Method for Surface Reconstruction from an Unstructured Point Set," the entire disclosure of which is incorporated herein by reference. Accordingly, embodiments wherein voxel-based surface models are generated using techniques other than that specifically described in detail herein remain within the spirit and scope of the present disclosure.

Further, and also for purposes of illustration, clarity, and ease of description, the description below will be limited to only the generation of a surface model corresponding to a single region of interest of the anatomic structure (e.g., the first region of interest). It will be appreciated, however, that the techniques described with respect to the generation of the surface model of the first region of interest may also be implemented by processing apparatus 16 to generate a surface model of the second region of interest, or any other regions of interest of the anatomic structure of interest. Accordingly, the surface model of the second region of interest (and any other regions of interest) may be generated using the same techniques described below.

Figure 6:
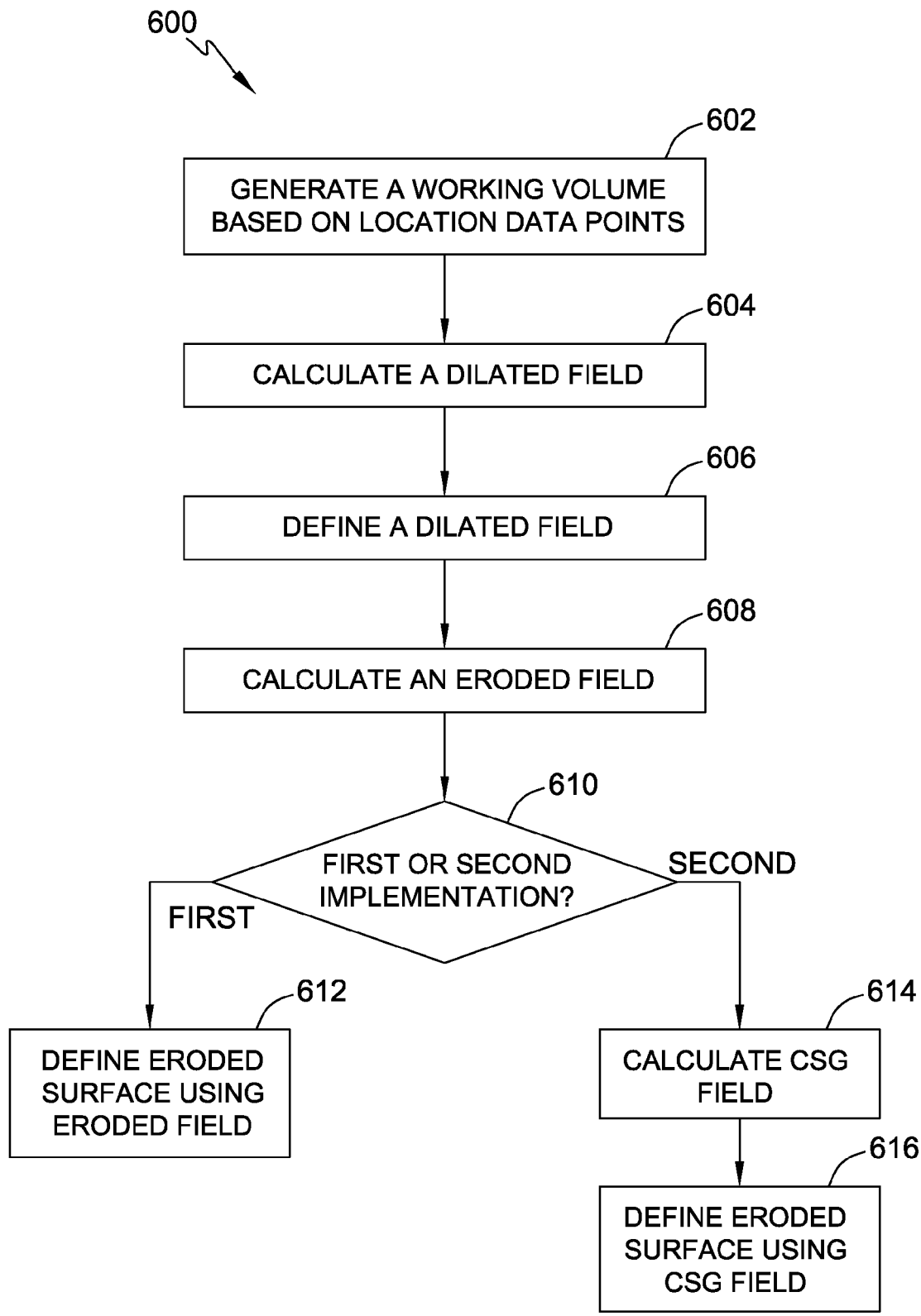
FIG. 6 is a flow diagram illustrating a method for generating a surface model based on location data points according to one embodiment.

FIG. 6 is a flow diagram of a method 600 for generating 106 a surface model based on location data points 46. In some embodiments, for example, the method 600 is performed using the processing apparatus 16 described above. FIGS. 7-10 illustrate the steps of method 600. For clarity, method 600 is illustrated as being performed in a two-dimensional space in FIGS. 7-10. However, those of skill in the art will appreciate that method 600 is generally performed in a three-dimensional space. As explained below, FIGS. 7-10 illustrate a second implementation of two implementations described herein.

As described herein, the surface model is generated based on a first predetermined value, $\alpha$, and a second predetermined value, k, as described herein. In this embodiment, the first predetermined value $\alpha$ is greater than the second predetermined value k such that ($\alpha$–k) is a positive quantity. Further, in this embodiment, k is at least as large as a voxel such that voxel grids used can resolve surface details. The first predetermined value, $\alpha$, controls the amount of fine detail in the surface model. The second predetermined value, k, controls a minimum radius of curves in the surface model. More specifically, the second predetermined value, k, moves the surface outward such that the surface model does not include any curves with a radius less than the second predetermined value, k.

Figure 7:
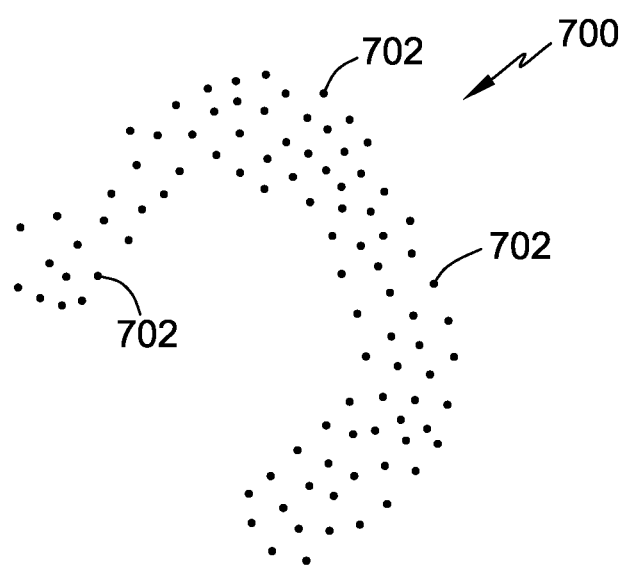
FIGS. 7-10 are schematic diagrams depicting the method shown in FIG. 6.

Referring initially to FIG. 7, a set 700 of location data points 702 are shown. Set 700 may be obtained, for example, using the techniques described above. As shown in FIG. 6, based on location data points 702, a working volume is generated 602. The working volume is a spatial volume that includes a plurality of discretized points, or locations, on a hexahedral grid. To generate the surface model, certain values are calculated for the locations within the working volume, as described in detail herein. In this embodiment, the working volume is generated by including all locations within a predetermined distance from location data points 702. For example, the predetermined distance may be a multiple of the first predetermined value $\alpha$ (e.g., 5$\alpha$).

Alternatively, the working volume may be generated using any suitable technique. For example, in one embodiment, an axis-aligned bounding box that includes all location data points 702 is determined. The bounding box is then expanded by at least twice a plus the voxel size in each direction, and is further expanded to ensure the bounding box dimensions are a multiple of the voxel size. As described below, if further points are collected such that the previous bounding box is no longer at least twice a plus the voxel size in at least one direction, the size of the bounding box in the at least one direction is multiplied by a real number greater than 1 (e.g., 2), ensuring the new working volume is a multiple of the voxel size and that the new voxels align with the old voxels. Using this procedure ensures that domain resizing occurs relatively infrequently. If the resized domain exceeds available memory, a larger voxel size may be utilized to limit memory usage.

In other embodiments, other voxel data structures could be used. For example, the working volume may utilize a DT-Grid, various non-hexahedral grids such as BCC lattices or hexagonal meshes, and/or sparse data structures in which single voxels or small regions of voxels may be added as needed. For any of these data structures, the working volume need not be a rectangular prism—but may be any configuration in which the working volume is able to represent, at minimum, all voxels that are within twice a of any location data point, plus their immediate neighbors. In the case of incremental updates to the working volume, the new voxels must align with the old voxels. Notably, any rapid method of choosing a working volume guaranteed to satisfy these criteria is appropriate. For sparse data structures, the working volume need not be chosen in advance because voxels may be added the first time they are interacted with.

A dilated field is calculated 604 for the working volume. Specifically, a dilated field value, D, is calculated for each location in the working volume. In this embodiment, the dilated field value D for a given location in the working volume is the distance from that location to the nearest location data point 702. The dilated field may be calculated 604, for example, using a modified Fast Marching algorithm, as described in detail below.

Figure 8:
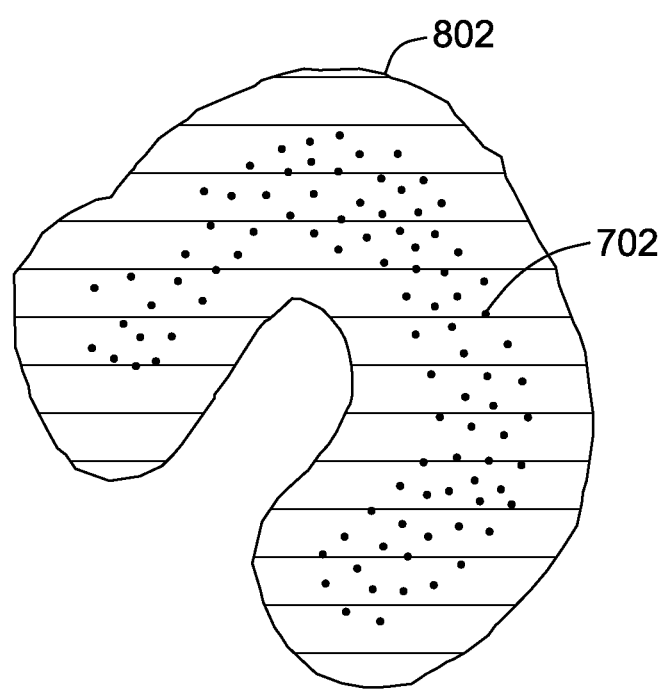

Based on the dilated field values, a dilated surface is defined 606. Specifically, as shown in FIG. 8, in this embodiment, a dilated surface 802 is defined such that each vertex on dilated surface 802 has a dilated field value D that is equal to the first predetermined value $\alpha$. In a first implementation, the dilated surface 802 is triangulated using the Marching Cubes algorithm. In this implementation, dilated surface 802 includes facets, edges, and vertices. In a second implementation, facets and edges are omitted, and dilated surface 802 is defined by vertices alone. The facets, edges, and vertices of the first implementation and the vertices of the second implementation may be referred to as an "erosion source geometry". Notably, in both implementations, vertices are interpolated between voxel centers to lie exactly on dilated surface 802. The second implementation may be computationally less intensive than the first implementation, and accordingly, may be performed more quickly than the first implementation.

In this embodiment, the value of a is a measure of distance on the order of millimeters that may be set as part of the set-up of system 10, and processing apparatus 16, in particular (i.e., during manufacture of system 10 or during the initialization of system 10 and prior to use). In other embodiments, $\alpha$ may be defined by the size of the medical device (e.g., $\alpha$ may be the radius or diameter of catheter 12, sensor 32, or a fraction or multiple thereof). Further, the value may be non-adjustable or it may be adjustable by the user of system 10 using, for example, a user interface 53 (best shown in FIG. 1), such as, for example, a touch screen, a keyboard, a keypad, a slider control, a graphical user interface having one or more user-selectable or user-inputtable fields, or some other user-controllable input device electrically connected to processing apparatus 16 to allow the user to set or adjust the $\alpha$ value.

Next, an eroded field is calculated 608 for the working volume. Specifically, an eroded field value, E, is calculated for each location in the working volume. In this embodiment, the eroded field value E for a given location in the working volume is the distance from that location to the nearest point on dilated surface 802. The eroded field may be calculated 608, for example, using a modified Fast Marching algorithm, as described in detail below.

When dilated surface 802 is defined 606 using the first implementation (i.e., including facets and edges), eroded field values E outside of dilated surface 802 are recorded as negative values, and eroded field values E inside of dilated surface 802 are recorded as positive values. When dilated surface 802 is generated using the second implementation (i.e., only vertices), all eroded field values E are positive values.

At this point processing apparatus 16 determines 610 whether dilated surface 802 was defined 606 using the first implementation (i.e., including facets and edges) or the second implementation (i.e., including only vertices).

Figure 9:
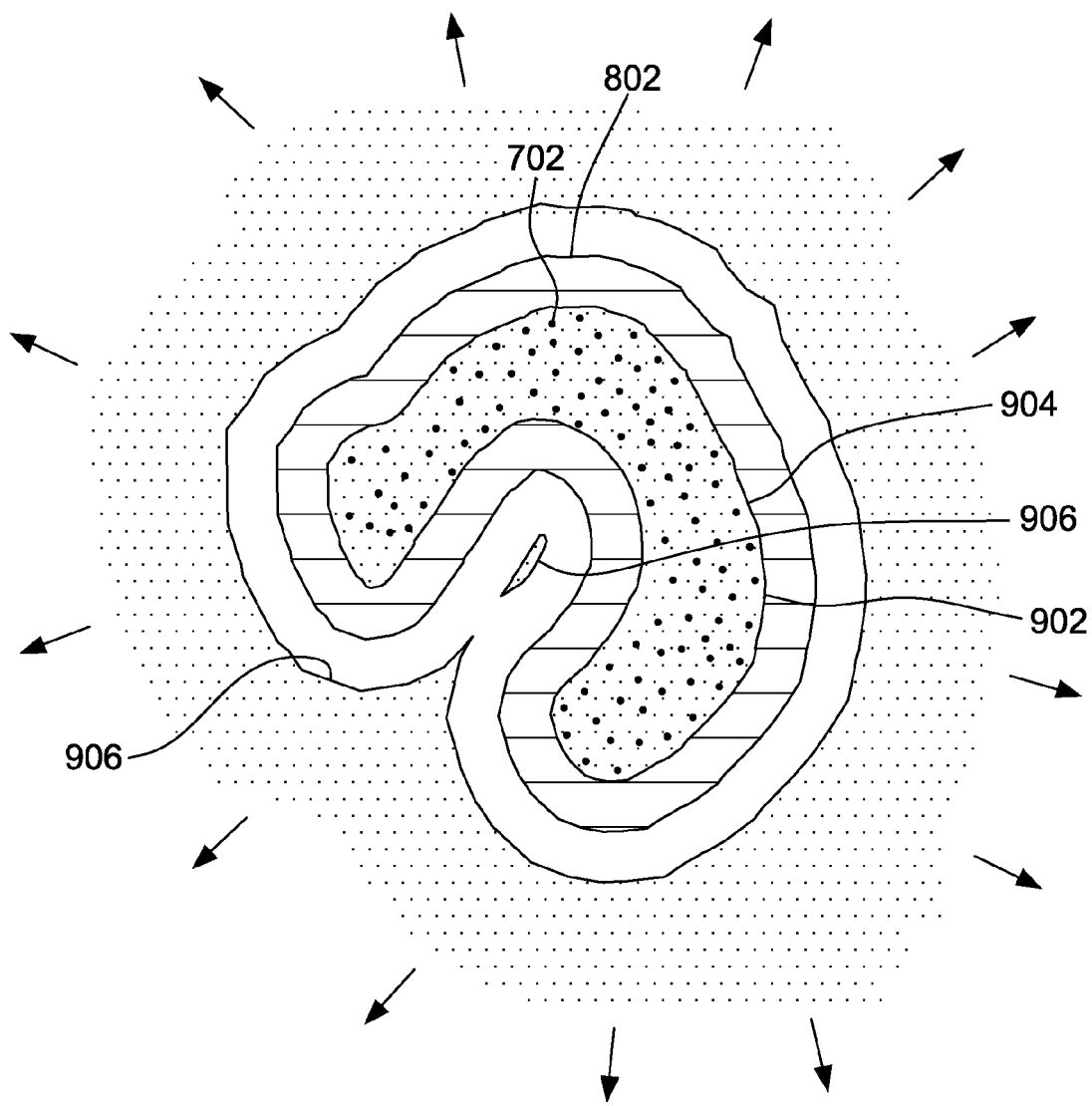

If processing apparatus 16 determines 610 the first implementation was used to define 606 dilated surface 802, an eroded surface is defined 612 based on the eroded field alone. Specifically, as shown in FIG. 9, in this embodiment, an eroded surface 902 is defined 612 such that each vertex on eroded surface 902 has an eroded field value E that is equal to ($\alpha$−k). Because eroded field values E outside of dilated surface 802 are recorded as negative values, and eroded field values E inside of dilated surface 802 are recorded as positive values in the first implementation, a single eroded surface 902 having vertices with eroded field values E equal to ($\alpha$−k) is defined 612. Further, eroded surface 902 is defined 612 within dilated surface 802.

However, under the second implementation, using the eroded field alone, multiple surfaces will be defined with vertices having an eroded field value E equal to ($\alpha$−k). Specifically, as shown in FIG. 9, a first surface 904 will be defined within dilated surface 802, and a second surface 906 will be defined exterior to dilated surface 802. First surface 904 corresponds to the desired eroded surface 902, but second surface 906 is extraneous.

Accordingly, if processing apparatus 16 determines 610 the second implementation was used to define 606 dilated surface 802, in order to keep first surface 904 and exclude second surface 906, a constructive solid geometry (CSG) field is calculated 614 based on the dilated field and the eroded field. Specifically, a CSG field value, C, is calculated for each location in the working volume. In this embodiment, the CSG field value C for a given location is the maximum of ($\alpha$−E+k) and (D−$\alpha$).

Figure 10:
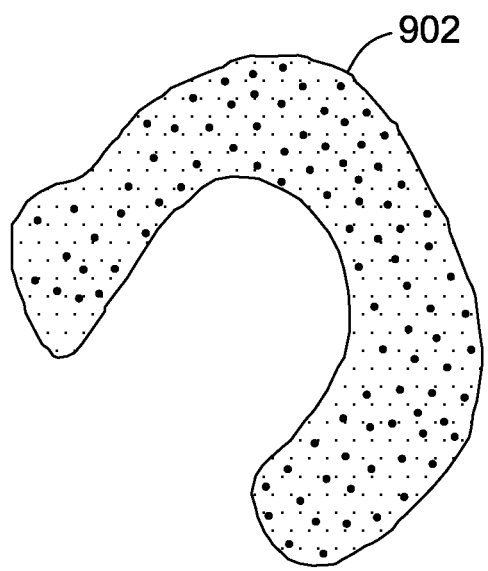

Notably, the CSG field value C will be negative inside of first surface 904 (where D<$\alpha$ and E>($\alpha$−k)), will be equal to zero at first surface 904, and will be positive at second surface 906 (where D>$\alpha$ and E=($\alpha$−k)). Accordingly, once the CSG field is calculated, the eroded surface 902 can be determined by defining 616 eroded surface 902 such that each vertex on eroded surface 902 has a CSG field equal to zero. This effectively excludes second surface 906 and selects first surface 904. FIG. 10 depicts only eroded surface 902, which is the surface ultimately generated using method 600.

Once a surface model is generated 106 using method 600, additional processing may be performed to modify the generated surface model. For example, the surface model may be decimated and/or smoothed using the techniques described in U.S. Patent Application Publication No. 2013/0173230 entitled "Method and System for Generating a Multi-dimensional Surface Model of a Geometric Structure," the entire disclosure of which is incorporated herein by reference.

Figure 11:
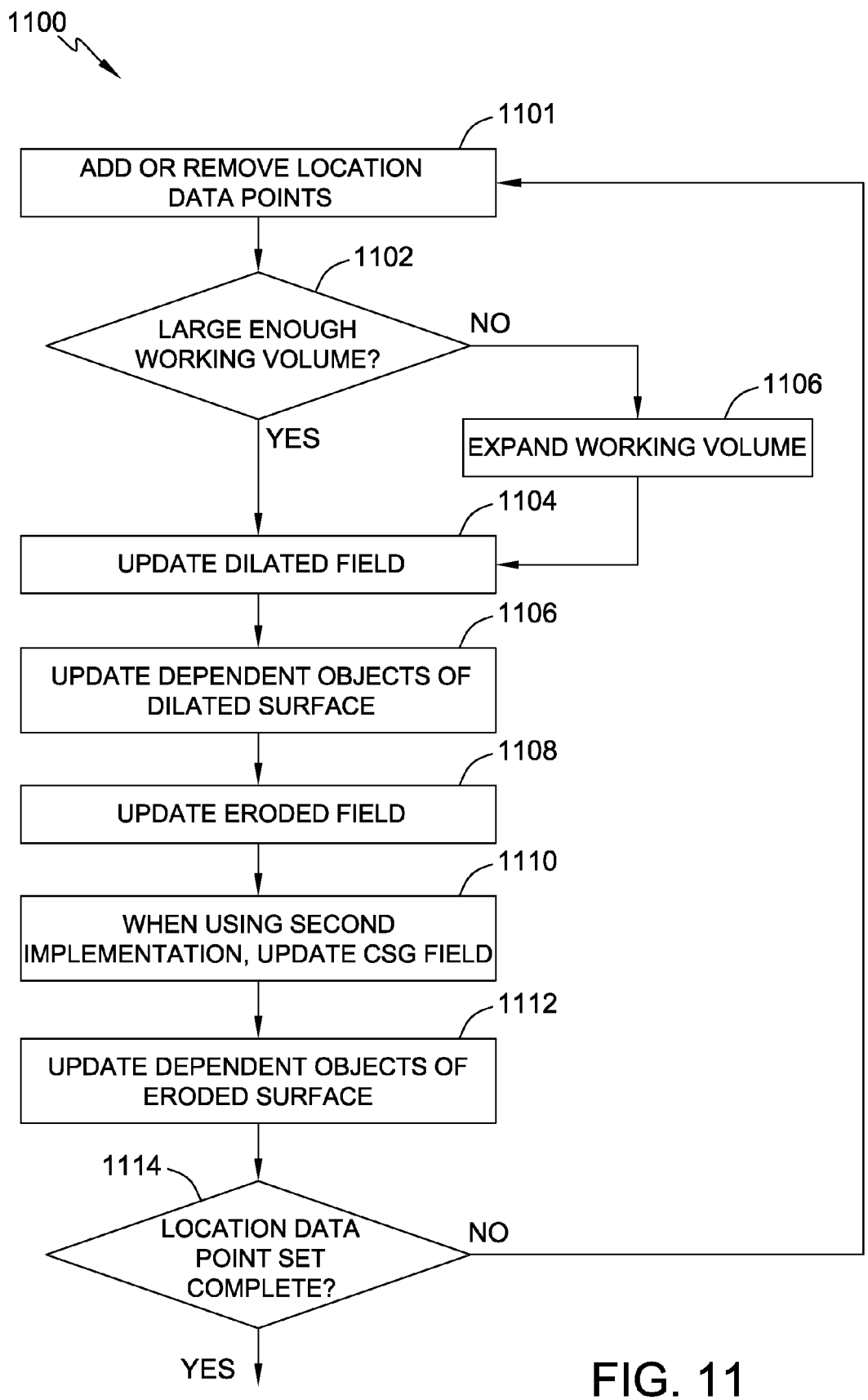
FIG. 11 is a flow diagram illustrating a method for updating a surface model according to one embodiment.

FIG. 11 is a flow diagram of a method 1100 for updating a surface model without rebuilding the surface model from scratch when new points are collected or some collected points are manually deleted. Unless otherwise indicated, method 1100 is performed by processing apparatus 16. Method 1100 begins when one or more location data points have been added are removed 1101. Subsequently, processing apparatus 16 initially determines 1102 whether the working volume has a large enough domain to accommodate the new points and a distance a in each direction. That is, the working volume can be considered to possess a bounding box, and all location data points must fall within a the bounding box by at least a distance a in each direction.

If the working volume has a large enough domain, processing apparatus 16 updates 1104 the dilated field. If the working volume does not have a large enough domain, the working volume is expanded 1106. Specifically, the size of the dilated, eroded, and CSG fields are increased by creating new, larger fields, and copying values from the previous fields into corresponding locations on the new fields. An axis-aligned bounding box is used for the working volume, and the working volume will double in any dimension where it is initially exceeded, until it is large enough to accommodate the new points and a distance a in each direction. This facilitates preventing the volume expansion routine from being run too frequently. Further, if the expanded working volume size will utilize relatively large amounts of memory, the voxel size is increased so that the expanded working volume will consume less memory, and the surface is rebuilt from scratch instead of performing the remaining steps of method 1100.

In other embodiments, the voxels may be stored as alternative data structures. For example, so long as there is a notion of adjacency (or proximity) between voxels, such data structures may not be regular hexahedral grids. Further, some data structures may not require the size of the working volume to be known and/or updated in advance, but instead may expand the working volume as-needed during the algorithm's run the first time a voxel is needed. Other suitable embodiments are also within the spirit and scope of the disclosure.

Once the working volume is expanded 1106, processing apparatus 16 updates 1104 the dilated field. The dilated field is updated 1104 to reflect the added and/or removed points. In this embodiment, the updating 1104 is performed using the modified Fast Marching method described below.

Where the dilated field changes due to the updating 1104, dependent vertices, edges, and/or facets of the dilated surface (i.e., the erosion source geometry) are updated 1106. Accordingly, only local updating of vertices, edges, and/or facets is performed.

Next, the eroded field is updated 1108 to reflect the added and/or removed primitives of the updated dilated field. In this embodiment, the updating 1108 is performed using the modified Fast Marching method described below. When the second implementation (i.e., including only vertices in the dilated surface) is utilized, the CSG field is also updated 1110 in all locations where the dilated and/or eroded field changed.

Finally, the eroded surface is updated 1112. Specifically, for the first implementation, where the eroded field changes due to the updating 1108, dependent vertices, edges, and/or facets of the eroded surface are updated 1112. Similarly, for the second implementation, where the CSG field changes due to the updating 1110, dependent vertices, edges, and/or facets of the eroded surface are updated 1112. Accordingly the eroded surface is updated only at objects that change due to the added and/or removed data points. If the location data point set is determined 1114 to be complete, method 1100 ends. If the location data point set is determined 1114 to be incomplete flow returns to block 1101 for adding or removing location data points.

As described above, in this embodiment, distance field construction (i.e., construction of the dilated field and the eroded field) is performed using a modified Fast Marching algorithm. A conventional Fast Marching algorithm keeps track of locations where the distance from a reference object (e.g., a point, vertex, facet, or edge) is known, extrapolates known distances to the neighboring locations where distance is unknown, and repeatedly moves the location with the closest extrapolated value into the known set, updating the extrapolated values of its neighbors.

In contrast, the modified Fast Marching algorithm disclosed herein quickly and straightforwardly propagates information identifying the closet collected point or erosion source point, instead of extrapolating distance. Accordingly, it computes an approximate voxelized Voronoi diagram of a set of points or of vertices, facets, and edges of a triangle mesh. The modified Fast Marching algorithm also avoids numerical extrapolation of distance values in favor of analytical computation of distance to the closet object, which facilitates improving accuracy. Compared with a conventional Fast Marching algorithm implementation, which operates by extrapolating known distance values, propagation of nearest-object information allows for faster updates when objects are removed. Both insertion and removal of geometric primitives can be accomplished with a local update operation.

The modified Fast Marching algorithms for building a signed distance field (e.g., the dilated field and the eroded field) from a triangle mesh and for building a signed distance field from a set of points will now be described in detail. Both algorithms are performed, for example, using processing apparatus 16. Both algorithms maintain a priority queue, Q, of triples (D, p, v), where D is a (possible signed) distance value, p identifies a primitive (i.e., point, vertex, facet, or edge), and v identifies a voxel. Both algorithms utilize a "rasterize" operation. As used herein, to rasterize a primitive p at (possibly signed) distance D from voxel v means to i) set the closest primitive of voxel v to p; ii) set the distance value of voxel v to D; and iii) add the triple (D, p, v) to the priority queue Q.

The modified Fast Marching algorithm to compute or update a signed distance field around a triangle mesh is as follows. This algorithm operates using a set of deleted primitives (vertices, edges, and faces) $\{p_i\}$ and a set $N \subseteq R$ of newly added primitives, where R is the combined set of remaining and new primitives after the operation of the algorithm.

An empty priority queue Q is created, and the following relationship is defined: $D_{max} = \alpha + \Delta x^{1/2}$, where $\alpha$ is the first predetermined value and $\Delta x$ is a voxel size. Then, for each voxel $v_i$ in the working volume, if the closest object at $v_i \notin R$, i) erase the closest point and distance value at $v_i$; and ii) for each voxel $v_j$ adjacent to $v_i$ that has some $r_k \in R$ as its closest point, a) let $r_{closest} = r_k$; b) while a vertex, facet, or edge adjoining $r_{closest}$ is closer to $v_j$'s center than $r_{closest}$, set $r_{closest}$ to be that primitive; c) compute D, the signed distance from $r_{closest}$ to $v_i$'s center; and d) if |D| is smaller than the absolute value of any signed distance so far rasterized onto $v_i$, rasterize $r_{closest}$ onto $v_i$. When performing step c), at silhouette vertices and edges, determine whether $v_i$ "sees" the silhouette from the inside or the outside when determining on which side of the face $v_i$ lies.

After the above is performed for each voxel $v_i$ in the working volume, for each $n_i \in N$, the following is performed. For each voxel $v_j$ intersected by $n_i$ that has some $r_k \in R$ as its closest point, a) let $r_{closest} = r_k$; b) while a vertex, facet, or edge adjoining $r_{closest}$ is closer to $v_j$'s center than $r_{closest}$, set $r_{closest}$ to be that primitive; c) compute D, the signed distance from $r_{closest}$ to $v_j$'s center; and d) if |D| is smaller than the absolute value of any signed distance so far rasterized onto $v_j$, rasterize $r_{closest}$ onto $v_j$. As above, when performing step c), at silhouette vertices and edges, determine whether $v_j$ "sees" the silhouette from the inside or the outside when determining sign; at faces, determine on which side of the face $v_j$ lies.

After the above is performed for each $n_i \in N$, while Q contains a triple (D, $r_i$, $v_j$) where $|D| \leq D_{max}$ (choosing a (D, $r_i$, $v_j$) triple such that |D| is minimized), the following is performed: i) remove (D, $r_i$, $v_j$) from Q, and ii) if $r_i$ remains the closest object so far rasterized onto $v_j$, for each $v_k$ adjacent to $v_j$, a) let $r_{closest} = r_i$; b) while a vertex, facet, or edge adjoining $r_{closest}$ is closer to $v_k$'s center than $r_{closest}$, set $r_{closest}$ to be that primitive; c) compute $D_2$, the signed distance from $r_{closest}$ to $v_k$'s center; and d) if $|D_2|$ is smaller than the absolute value of any signed distance so far rasterized onto $v_k$, rasterize $r_{closest}$ onto $v_k$.

The modified Fast Marching algorithm to compute distance fields around a set of points differs slightly from the algorithm to compute or update a signed distance field around a triangle mesh. Because adjacent primitives are not traversed during Fast Marching, it is possible to use a flood-fill operation to remove points from the source geometry without looping over the entire working volume. Accordingly, to remove the contribution of a set of points P from a distance field, and add a set N ⊆ R of new points, where R is the combined set of remaining and new points after the update, the algorithm operates as follows.

An empty priority queue Q is created, an empty set V of voxel identifiers is created, and the following relationship is defined: $D_{max}=\alpha+\Delta x^{1/2}$, where $\alpha$ is the first predetermined value and $\Delta x$ is a voxel size. For each, let $v_j$ be the voxel intersected by $p_i$ and if $p_i$ is the closest point at $v_j$, add $v_j$ to V.

Then, for each $v_i \in V$, perform a flood-fill over the contiguous region of the working volume containing $v_i$ in which a distance value is recorded and the closest point is not in R. For each voxel $v_j$ in the contiguous region i) erase the closest point and distance value at $v_j$; and ii) for each voxel corner $v_k \notin V$ adjacent to $v_j$ that has $r_m \in R$ as its closest point, a) compute D, the distance from $r_m$ to $v_j$'s center; and b) if D is smaller than any distance so far rasterized onto $v_j$, rasterize $r_m$ onto $v_j$.

Then, for each $n_i \in N$, i) let $v_j$ be the voxel intersected by $n_i$; ii) compute D, the distance from $n_i$ to $v_j$; and iii) if D is less than any distance so far rasterized onto $v_j$, rasterize $n_i$ onto $v_j$.

After the above is performed for each $n_i \in N$, while Q contains a triple (D, $p_i$, $v_j$) where $|D| \leq D_{max}$ (choosing a (D, $p_i$, $v_j$) triple such that $|D|$ is minimized), the following is performed: i) remove (D, $p_i$, $v_j$) from Q, and ii) if $p_i$ remains the closest object so far rasterized onto $v_j$, for each voxel $v_k$ adjacent to $v_j$, a) compute $D_2$, the signed distance from $p_i$ to $v_k$'s center; and b) if $D_2$ is less than any distance so far rasterized onto $v_k$, rasterize $p_i$ onto $v_k$.

Generating a surface model using the systems and methods disclosed herein has several advantages over at least some known surface model generation techniques. For example, using the systems and methods described herein, relative to the systems and methods described in U.S. Pat. App. Pub. No. 2013/0173230, performance may be improved from $O(n\Delta x^{-3})$ to $O(n+V\Delta x^{-3} \log A \Delta x^{-2})$, where $\Delta x$ is a voxel size, n is a number of collected points plus the size of a description of an erosion source geometry, V is volume, A is surface area, and O defines a set of runtimes that, for large n and small $\Delta x$, are at most proportional to the above expressions.

Accordingly, using the systems and methods described herein decouples the number of points from the voxel size, producing an output sensitive algorithm in which the first term (time for a rasterization step) depends only on the number of points, and the second term (time for Fast Marching) depends only on the voxel size and the geometry of the result.

This has two advantageous consequences. First, much denser point clouds may be used, making it easier for physicians to identify "tenting" and other inaccurate or undesirable collected points for manual removal. As used herein, "tenting" refers to a catheter pushing against tissue and making a chamber volume appear larger than if the catheter were not pushing against the tissue. Generally, tenting is a momentary condition that results in only a few location data points lying outside the normal volume boundary. If the "real" location data points are dense enough, then outlier points due to tenting are more easily detected because they appear relatively isolated from the main cloud. Accordingly, dense point clouds are advantageous.

As a second advantageous consequence, smaller voxel sizes become feasible for dense point clouds, allowing for improved surface accuracy. Using the systems and methods described herein improves performance at a given voxel size as long as $\rho>O(\log A \Delta x^{-2})$, where $\rho$ is the point density inside the surface (equal to n/V). In practice, memory may become limiting well before voxel size becomes small enough to reach this threshold.

Further, using the systems and methods described herein, facet orientations and vertex positions may be more accurate as compared to at least some known techniques. Moreover, the generated surface changes smoothly as a varies, which may allow for more intuitive control of the level of detail as compared to the systems and methods described in, for example, U.S. Pat. App. Pub. No. 2013/0173230. Additionally, the surface can be updated locally as collected points are added or removed, rather than the much more computationally-intensive technique of rebuilding the surface from scratch. This also allows for denser point clouds and higher resolution.

It should be understood that model construction system 14, and particularly processing apparatus 16, as described above, may include conventional processing apparatus known in the art, capable of executing pre-programmed instructions stored in an associated memory, all performing in accordance with the functionality described herein. It is contemplated that the methods described herein, including without limitation the method steps of embodiments of the invention, will be programmed in some embodiments, with the resulting software being stored in an associated memory and where so described, may also constitute the means for performing such methods. Implementation of the invention, in software, in view of the foregoing enabling description, would require no more than routine application of programming skills by one of ordinary skill in the art. Such a system may further be of the type having both ROM, RAM, a combination of non-volatile and volatile (modifiable) memory so that the software can be stored and yet allow storage and processing of dynamically produced data and/or signals.

Although certain embodiments of this disclosure have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A system for generating a multi-dimensional surface model of a geometric structure, the system comprising:
   a device comprising at least one sensor configured to collect a set of location data points corresponding to respective locations on or enclosed by a surface of the geometric structure; and
   a computer-based model construction system coupled to the device and by executing the ordered sequence configured to:
   generate a working volume based on the set of location data points, the working volume including a plurality of discretized locations;
   calculate a dilated field for the working volume;
   define a dilated surface based on the dilated field;
   calculate an eroded field for the working volume based on the dilated surface by calculating an eroded field value E for each discretized location in the working volume, wherein the eroded field value E is a distance between a location and a closest point on the dilated surface;
   define an eroded surface based on the eroded field; and
   update the generated surface model when at least one of new location data points are collected and existing location data points are removed, the processing apparatus configured to update the generated surface model by executing the ordered sequence of:
   updating the dilated field;
   updating the dilated surface;
   updating the eroded field; and
   updating the eroded surface.

2. The system of claim 1, wherein to calculate a dilated field, the computer-based model construction system is configured to calculate a dilated field value D for each discretized location in the working volume, and wherein the dilated field value D is a distance between a location and a closest location data point.

3. The system of claim 2, wherein to define a dilated surface, the computer-based model construction system is configured to define the dilated surface such that each vertex on the dilated surface has a dilated field value D equal to a first predetermined value α.

4. The system of claim 1, wherein to define an eroded surface, the computer-based model construction system is configured to define the eroded surface such that each vertex on the eroded surface has an eroded field value E equal to a difference between a first predetermined value a and a second predetermined value k.

5. The system of claim 1, wherein to calculate a dilated field and to calculate an eroded field, the computer-based model construction system is configured to calculate the dilated field and the eroded field using a modified Fast Marching algorithm that utilizes propagation of nearest-object information.

6. The system of claim 1, wherein to define an eroded surface based on the eroded field, the computer-based model construction system is configured to:
   calculate a constructive solid geometry field based on the dilated field and the eroded field; and
   define the eroded surface based on the constructive solid geometry field.

7. A computer-implemented method of generating a multi-dimensional surface model of a geometric structure, the method comprising the ordered sequence of:
   acquiring a set of location data points corresponding to respective locations on or enclosed by a surface of the geometric structure;
   generating a working volume based on the set of location data points, the working volume including a plurality of discretized locations;
   calculating a dilated field for the working volume;
   defining a dilated surface based on the dilated field;
   calculating an eroded field for the working volume based on the dilated surface by calculating an eroded field value E for each discretized location in the working volume, wherein the eroded field value E is a distance between a location and a closest point on the dilated surface;
   defining an eroded surface based on the eroded field; and
   updating the generated surface model when at least one of new location data points are collected and existing location data points are removed by the ordered process of:
   updating the dilated field;
   updating the dilated surface;
   updating the eroded field; and
   updating the eroded surface.

8. The method of claim 7, wherein calculating a dilated field comprises calculating a dilated field value D for each discretized location in the working volume, and wherein the dilated field value D is a distance between a location and a closest location data point.

9. The method of claim 8, wherein defining a dilated surface comprises defining the dilated surface such that each vertex on the dilated surface has a dilated field value D equal to a first predetermined value a.

10. The method of claim 7, wherein defining an eroded surface comprises defining the eroded surface such that each vertex on the eroded surface has an eroded field value E equal to a difference between a first predetermined value a and a second predetermined value k.

11. The method of claim 7, wherein calculating a dilated field and calculating an eroded field comprises calculating the dilated field and the eroded field using a modified Fast Marching algorithm that utilizes propagation of nearest-object information.

12. The method of claim 7, wherein defining an eroded surface based on the eroded field comprises:
   calculating a constructive solid geometry field based on the dilated field and the eroded field; and
   defining the eroded surface based on the constructive solid geometry field.

13. A processing apparatus for generating a multi-dimensional surface model of a geometric structure, the processing apparatus by executing the ordered sequence configured to:
   acquire a set of location data points corresponding to respective locations on or enclosed by a surface of the geometric structure;
   generate a working volume based on the set of location data points, the working volume including a plurality of discretized locations;
   calculate a dilated field for the working volume;
   define a dilated surface based on the dilated field;

calculate an eroded field for the working volume based on the dilated surface by calculating an eroded field value E for each discretized location in the working volume, wherein the eroded field value E is a distance between a location and a closest point on the dilated surface;
define an eroded surface based on the eroded field; and
update the generated surface model when at least one of new location data points are collected and existing location data points are removed, the processing apparatus configured to update the generated surface model by executing the ordered sequence of:
updating the dilated field;
updating the dilated surface;
updating the eroded field; and
updating the eroded surface.

14. The processing apparatus of claim 13, wherein to calculate a dilated field, the processing apparatus is configured to calculate a dilated field value D for each discretized location in the working volume, and wherein the dilated field value D is a distance between a location and a closest location data point.

15. The processing apparatus of claim 13, wherein to calculate a dilated field and to calculate an eroded field, the processing apparatus is configured to calculate the dilated field and the eroded field using a modified Fast Marching algorithm that utilizes propagation of nearest-object information.

16. The system of claim 3, wherein to define a dilated surface, the computer-based model construction system is configured to define the vertices of the dilated surface by interpolating between voxel centers.

17. The method of claim 9, wherein defining a dilated surface comprises defining the vertices of the dilated surface by interpolating between voxel centers.

18. The processing apparatus of claim 13, wherein to define a dilated surface, the processing apparatus is configured to define vertices of the dilated surface by interpolating between voxel centers.

\* \* \* \* \*